(12) United States Patent
Hardie

(10) Patent No.: US 6,935,602 B2
(45) Date of Patent: Aug. 30, 2005

(54) SECURITY CHAIN ANCHORS

(76) Inventor: Frank James Hardie, 17 Station Rd., Flitwick, Bedfordshire, MK45 1JT (GB)

( * ) Notice: Subject to any disclaimer, the term of this patent is extended or adjusted under 35 U.S.C. 154(b) by 0 days.

(21) Appl. No.: 10/755,204

(22) Filed: Jan. 9, 2004

(65) Prior Publication Data

US 2005/0151047 A1    Jul. 14, 2005

(51) Int. Cl.[7] ............................................. B65D 63/00
(52) U.S. Cl. ................................... 248/499; 410/111
(58) Field of Search ............................. 248/500, 505, 248/499; 24/565 CD, 115 K; 410/101, 102, 410/106, 107, 111, 109, 112, 116; 52/698

(56) References Cited

U.S. PATENT DOCUMENTS

| | | | |
|---|---|---|---|
| 4,592,686 A | 6/1986 | Andrews | |
| 4,907,921 A * | 3/1990 | Akright | 410/111 |
| 5,052,869 A | 10/1991 | Hansen, II | |
| 5,774,948 A * | 7/1998 | Petschke et al. | 24/265 CD |
| 6,142,718 A * | 11/2000 | Kroll | 410/106 |
| 6,161,883 A * | 12/2000 | Pearl | 294/1.1 |
| 6,578,889 B2 * | 6/2003 | Pearl | 294/1.1 |
| 6,641,342 B1 * | 11/2003 | Girardin | 410/106 |
| 6,824,340 B1 * | 11/2004 | Stout | 410/116 |

FOREIGN PATENT DOCUMENTS

GB        1 316 021        5/1973

* cited by examiner

Primary Examiner—Ramon O Ramirez
(74) Attorney, Agent, or Firm—Bradley N. Ruben

(57) ABSTRACT

The present invention provides a security chain anchor which comprises: a base plate that is bolted or otherwise securely fastened, in use, to a fixed surface such as, for example, a floor or wall; and a loop-bearing member having a rigid loop mounted thereto to receive a tether, wherein the loop is pivotally mounted to the loop-bearing member and the loop-bearing member is rotatable relative to the base plate.

10 Claims, 4 Drawing Sheets

FIG. 6
FIG. 7
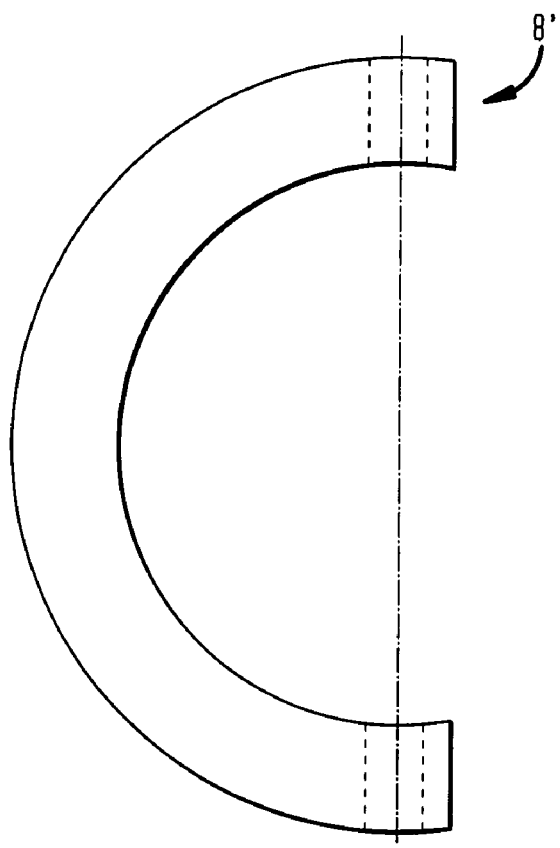
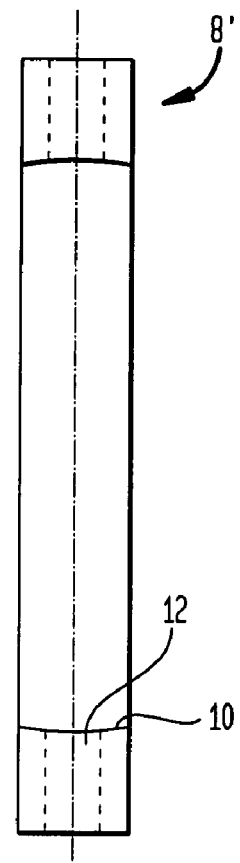
FIG. 6A
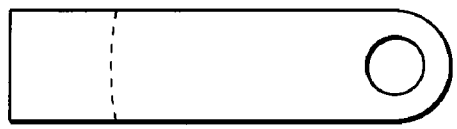

US 6,935,602 B2

SECURITY CHAIN ANCHORS

FIELD OF THE INVENTION

The present invention concerns security chain anchors, being anchors to which security chains for securing any otherwise moveable object that may be vulnerable to theft are fastened in use. The term security chain is intended to encompass braided wire rope/steel hawsers and, indeed, any other such means as are used to tie down or tether moveable objects against theft.

BACKGROUND TO THE INVENTION

Bicycles and motor bikes, particularly, are prime targets for theft for the fact that they are often of necessity parked in generally open, public or private places to which a thief has ready access. Furthermore, it is generally not sufficient to simply immobilise the bicycle or motor cycle with a chain through the wheels or other part of the cycle to prevent wheeling motion or steering since this may not obstruct the determined thief.

The cyclist or motor cyclist, for example, has the choice of a range of different forms of security chain for tying down/securely tethering their motor vehicle. In general, however, there is little in the way of provision of suitable means for anchoring the security chains in a convenient and space efficient manner. Public parking facilities may provide cycle stands that comprise looping steel structures that can not only serve as props for the cycle but also as a fixed anchor for the security chain. However, such installations are impractical and inappropriate in space restricted areas.

It is a general object of the present invention to provide a cost effective, compact and secure anchor for security chains.

Although one suitable area of use of such anchors is in th prevention of theft of cycles and motor cycles, the anchors may be used in association with any moveable property that is vulnerable to theft. Other examples of use include tethering of industrial plant or construction industry plant.

SUMMARY OF THE INVENTION

According to the present invention there is provided a security chain anchor which comprises:
a base plate that is bolted or otherwise securely fastened, in use, to a fixed surface such as, for example, a floor or wall; and a loop-bearing member having a rigid loop mounted thereto to receive a tether, wherein the loop is pivotally mounted to the loop-bearing member and the loop-bearing member is rotatable relative to the base plate, and wherein the base plate is substantially circular-cylindrical and the loop-bearing member is formed as an annular sleeve that encircles the base plate and is held captive adjacent the fixed surface, in use, by the base plate but is rotatable around the base plate.

Suitably the loop bearing member is fully rotatable, ie. rotatable through 360° relative to the base plate.

Preferably the loop is adapted to nest against the exterior of the loop-bearing member so that the, as installed, upper face presented by the anchor may be substantially flat when the loop is not in use.

Preferably the loop is formed as part of an annulus of a larger diameter than the loop-bearing member. The loop bearing member may be substantially circular cylindrical, and the loop may be part of a circular cylinder of larger diameter.

The loop bearing member may be a segment of a notional sphere and the loop may be part of a segment of a larger notional sphere that is substantially concentric with th notional sphere of the loop bearing member. Irrespective of whether the exterior of the loop bearing member is spherically curved, importantly, the radially inner face of the loop and the radially outer face of the loop bearing member that nest together each have a mating spherical curve, whereby the loop may, for example, be pivoted through 180 degrees to move from lying against one side of the loop bearing member to lying against its other side while maintaining a substantially constant tight tolerance of fit of the loop to the loop bearing member and better resisting attack by tools.

In one particularly preferred construction, one or both of the loop-bearing member and the loop are formed from existing pipe sections. This enables considerable cost savings in the construction of the anchor. The components may be readily adapted to the required configuration by simple machining actions.

Preferably the base plate has a central bolt receiving aperture. The base plate, loop-bearing member and loop are preferably all concentrically positioned relative to the central bolt. This configuration provides an extremely simple and compact arrangement while allowing for full freedom of movement of the loop relative to the bolt.

Particularly preferably the base plate has a bolt receiving aperture to fasten to the fixed surface and the bolt receiving aperture is counterbored and the anchor further comprises a blanking cap that fits, in use, tightly suitably as an interference fit within the counterbore over the top of the bolt when the anchor has been installed to resist subsequent access to the bolt.

BRIEF DESCRIPTION OF THE DRAWINGS

Preferred embodiments of the present invention will now be more particularly described, by way of example, with reference to the accompanying drawings, wherein:

—FIG. 4 is a section taken along the line IV—IV in FIG. 3;

FIGS. 6, 6a and 7 are, respectively, a top plan view and end elevation view and a side elevation view of a loop of a second preferred embodiment of the invention;

DESCRIPTION OF THE PREFERRED EMBODIMENT

Figure 1:
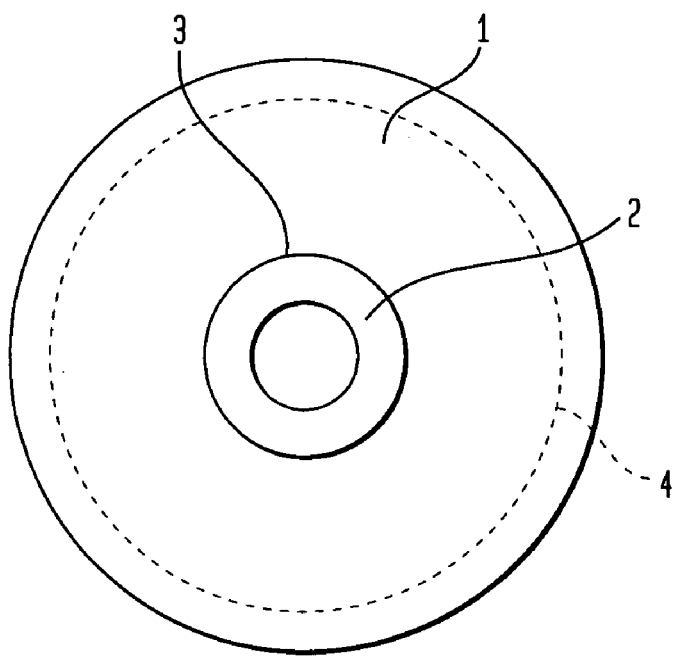
FIG. 1 and FIG. 2 are, respectively, a top plan view and a sectional view of a base plate of the first preferred embodiment of anchor.
Figure 2:
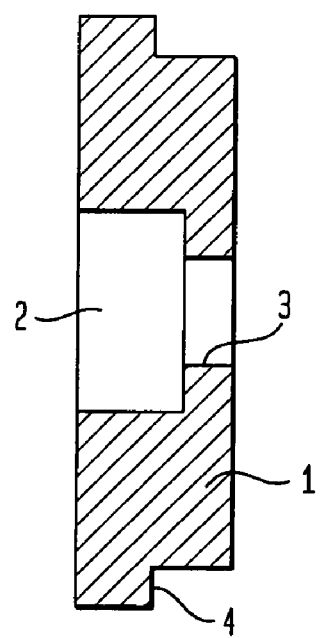

The illustrated anchor comprises a substantially concentric configuration of annular components.

At the heart of the anchor, and not illustrated, is a long bolt of the type that is suitable for securely lodging into a concrete floor or other fixed surface and resisting powerful tensile/withdrawal forces—suitably having an associated expanding body.

The head of the bolt seats within a central circular recess 2 of a circular cylindrical base plate 1 and with the shank of the bolt passing down through an aperture 3 at the centre of the base plate 2.

The recess 2 is suitably circular and concentric to the central aperture 3. The radius of each of the central aperture 2 and the recess 3 are selected to suit th radius of th head and shank, respectively, of the bolt to be used.

The circular cylindrical form of the base plate 1 incorporates a step 4 in its outer cylindrical face.

The base plate 1 may suitably be formed as a single block of metal or metal alloy that is machined to provide the concentric circular aperture 3 and recess 2 in addition to the step 4 of the outer cylindrical wall.

Figure 5:
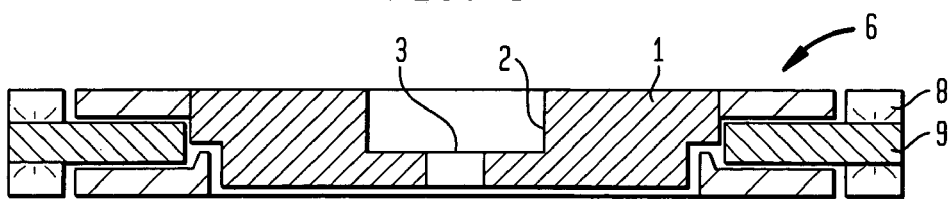
FIG. 5 is a sectional view illustrating the base plate mounted in place within the loop-bearing member.
Figure 8:
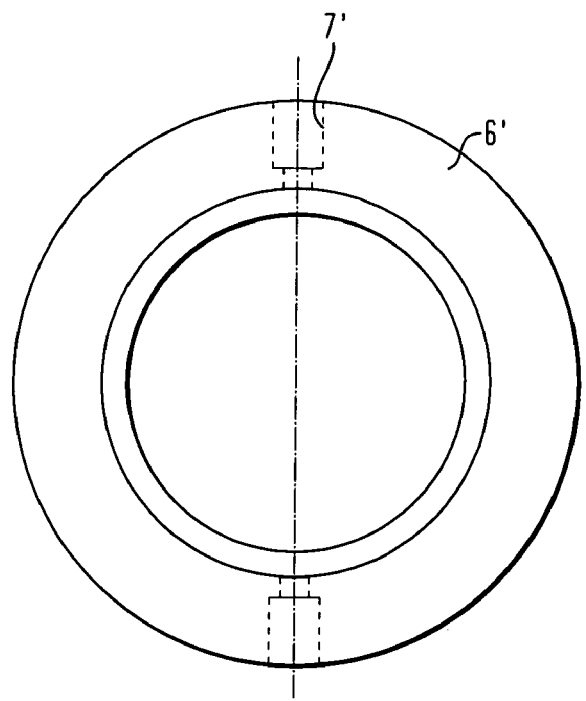
FIGS. 8 and 9 are, respectively a top plan view and side elevation view of a loop bearing member of the second embodiment of the invention.
Figure 9:
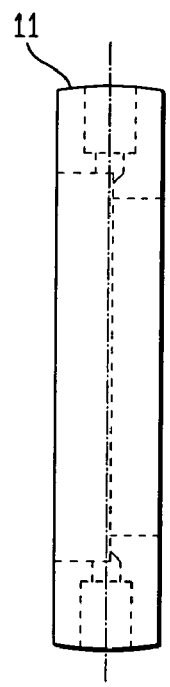
Figure 10:
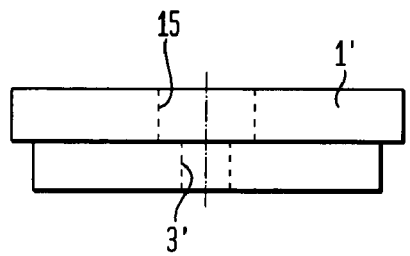
FIG. 10 is a side elevation view of a base plate of the second preferred embodiment.

The purpose of the step 4 is to provide a shoulder that will seat against a corresponding annular ledge 5 within a circular cylindrical loop-bearing member 6 as can best be seen in FIG. 5.

The circular cylindrical loop-bearing member 6 is suitably formed of a short section of steel pipework. In the illustrated example, which is substantially to the scale of one working embodiment, the length of steel piping used is 15 mm in length and with a 105 mm circumference.

In addition to being machined to provide the ledge 5 in the inner bore of the loop-bearing member 6, a pair of pivot holes 7 are drilled in radially opposing positions through the wall of the member 6. A loop 8 to which the securing tether is to be mounted is itself secured to the loop-bearing member 6 by a pivot pin 9 at each end and extending through the respective holes 7.

The pivot pins 9 are shown as welded directly to the very ends of the tethering loop but may, of course, be passed through holes near the ends of the tethering loops. The loop 8 is easily and economically formed as an arcuate portion of a short section of steel pipe similar to the steel pipe used to make the loop-bearing member 6 but in this case with a larger diameter sufficient to part encircle the loop-bearing member 6.

Figure 3:
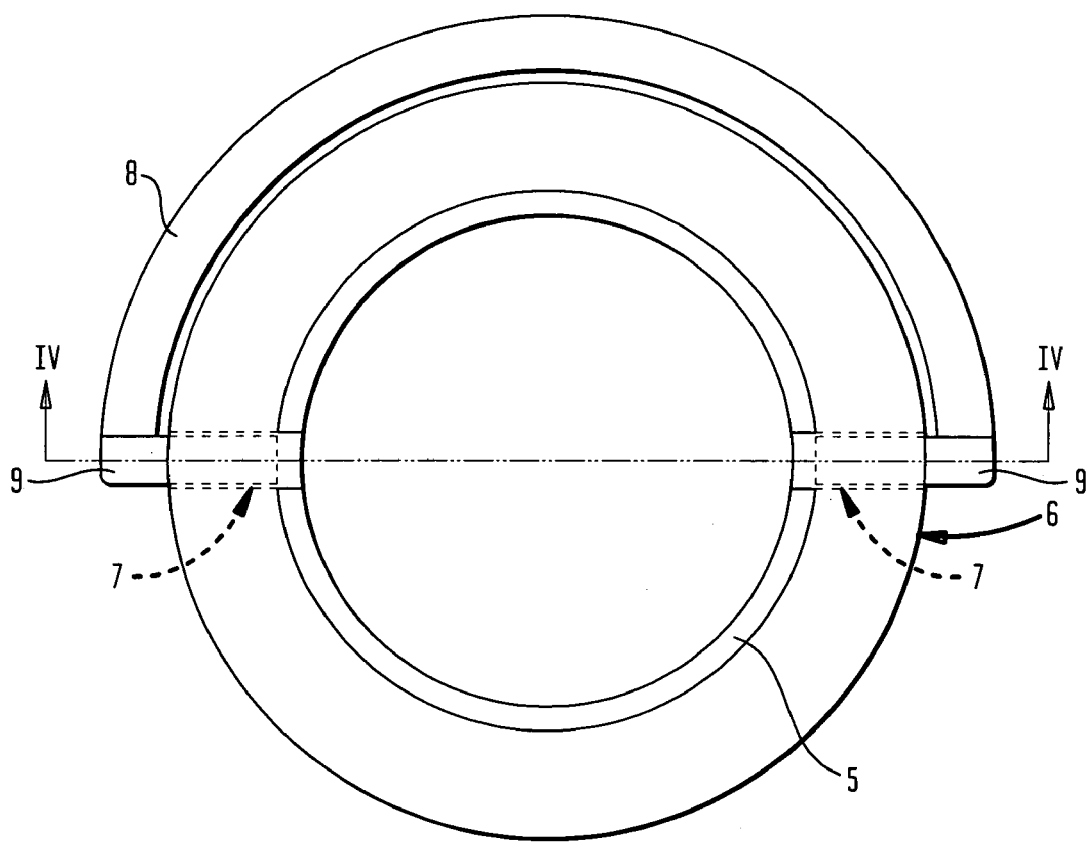
FIG. 3 and FIG. 4 are, respectively, a top plan view and sectional view of a loop-bearing member and loop of the first preferred embodiment of anchor
Figure 4:
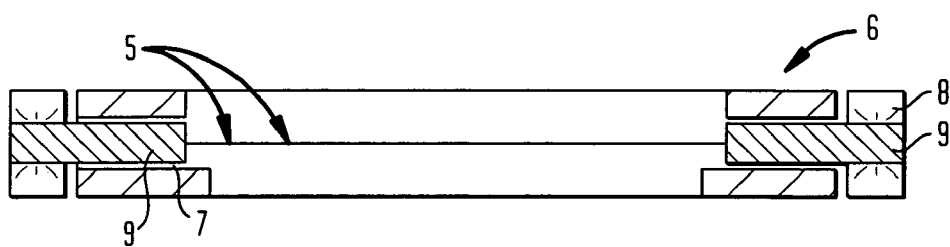

As can be readily seen from FIG. 3, the loop 8 nests cleanly against the cylindrical external surface of the loop-bearing member 6 to present a substantially completely flat upper surface to the anchor when the anchor is bolted to, for example, the ground.

The ability of the loop 8 to stow neatly in this fashion renders it highly compact when not in use such that even if it is installed in the centre of a driveway it will be relatively unobtrusive.

With the configuration of the invention it is totally feasible to permanently install an anchor of the invention in a driveway where ft may be repeatedly driven over by the wheels of a car, without problem.

When required for use, the loop 8 simply pivots outwardly from the plane of the bearing member 6 to enable the security chain to be passed through it. For optimal flexibility in use of the anchor, not only does the inclination of the loop 8 vary but also the radial orientation of the loop 8 around the central fixing bolt.

The base plate 1 that is bolted to the fixed surface holds the loop-bearing member 6 captive adjacent the fixed surface but does not prevent the bearing member 6 from rotating around the base plate 1. When installing the anchor, allowance should be made for a small clearance between the ledge 5 of the bearing member 6 and the shoulder 4 of the base plate 1 or they should only lightly inter-engage so that any friction between them is minimised.

By configuring the anchor with the loop 8 outermost any risk of the anchor and tether snaring is minimised and versatility of use is optimised.

Referring now to the second preferred embodiment of the invention illustrated in FIGS. 6 to 12, in this embodiment the loop 8' and the loop bearing member 6' are respectively formed with their mating surfaces—i.e. the radially outer face 11 of the loop bearing member 6' and the radially inner face 10 of the loop 8'—having a concentric spherical curvature. This spherical curvature allows maintenance of tight tolerance of mating fit of the loop 8' to the loop bearing member 6' even as the loop 8' pivots about its pivotal attachment to the loop bearing member 6'. This arrangement substantially increases the security of the device in resisting attack from hacksaws or chisels, protecting the pivot pins 9, from damage.

In this second embodiment modification has also been made to the pivot pins 9' and the nature of their mounting. In FIGS. 6 and 7 it will be seen that the pivot pins 9' are not welded to the end faces of the loop 8' but are, instead, accommodated within respective sockets 12 near to the ends of the loop 8'. This again, adds to the overall protection of the pivot pins 9' from attack.

Figure 13:
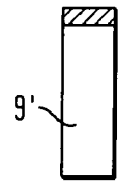
FIG. 13 is a side elevation view of a pivot pin for use in the second preferred embodiment.

From FIG. 13 it will be seen the pivot pins 9' are chamfered at each end and closely cooperatively engaged with the pivot holes 7' of the loop bearing member 6'. The preferred material for the pivot pins 9' is silver steel and they suitably have dimensions of the order of, for example, 33 millimeters in length with 10 mm diameter and 3 mm induction hardening at one end. An annular groove near to one end of the pivot pin 9' allows for interference fit of the pivot pin 9' in the socket 12.

Figure 11:
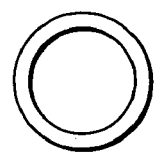
FIGS. 11 and 12 are, respectively, an underside plan view and side elevation view of a blanking cap for use with the base plate of the second preferred embodiment.
Figure 12:
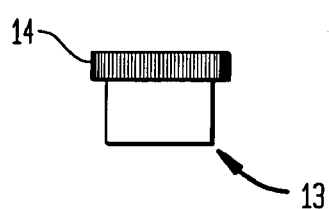

Referring to FIGS. 11 and 12, the second preferred embodiment further differs from the first in having a blanking cap 13 for substantially preventing access to the bolt by which the base plate 1' is fastened to the fixed surface in use. The blanking cap 13 is circular cylindrical with an enlarged diameter top portion that is machined to be serrated on its outer circumferential face 14. This blanking cap 13 is designed to be an interference fit in a counterbore 15 of the socket 3' for the bolt.

Where, for example, the bolt is a 12 mm socket head bolt and fixed by raw fixing into concrete, the blanking cap 13 is inserted into the counterbore 15 after the bolt has been tightened and the cylindrical side wall of the blanking cap 13 passes concentrically over the head of the bolt. The machine serrated top 14 of the blanking cap 13 is an interference fit with the counterbore 15 and is hammered and keyed into place. This stops the blanking cap 13 from subsequently being removed. Furthermore, by hardening the blanking cap 13 it is able to resist drill attack and provides a very effective means of preventing access to the bolt. Example dimensions and materials suitable for construction of a ground anchor in accordance with the second preferred embodiment of the invention will be briefly listed below. Alternative example dimensions are also given in the drawings for a smaller anchor. Differing dimensions may be used depending in part upon the end application of the anchor. For bicycles and small bicycles the anchor may be relatively small in comparison to one for mopeds or one for large motorbikes.

Lame Embodiment

Loop 8'—material mild steel (50 Rockwell) hollow bar, heat treatment case hardened to 0.5 mm deep, zinc plated finish dimensions 149 mm outside diameter, 108.5 mm inside diameter machined with a spherical curve. Overall thickness 20 mm, two in line holes 10.1 mm diameter to receive the pins 9'.

Loop-bearing member 6'—material mild steel hollow bar, case hardened to 0.5 mm deep, zinc plated finish (no plating in holes) dimensions—108 mm outside diameter machined with spherical curve. Stepped internal diameter 76 mm at 11 mm diameter deep and 67 mm, leaving shoulder of 4.5 mm overall thickness 20 mm. Two in line holes 10 mm diameter, drilled into the 108 mm diameter spherical curve (central to the 20 mm thickness).

Base Plate 1'—material mild steel billet, heat treatment case hardened to 0.5 mm deep, zinc plated finish, dimensions: 75 mm outside diameter, 10 mm thick. Turned to 65 mm diameter, increasing to 20 mm thick. Reform hardening, centrally drilled at 30 mm diameter and counterbored from the 75 mm diameter side to 14 mm deep.

Blanking cap 13—material mild steel, case hardened to 0.5 mm deep, zinc plate finish; dimensions: 25 mm diameter at 5 mm (grooved), reducing to 24.75 mm diameter for 9 mm (total depth 14 mm). Bored out from the 24.75 mm diameter at 20 mm×12 mm deep with machined flat top on knurled/serrated end.

The pins 9' are suitable silver steel induction hardened at one end, lightly zinc plated and with a small 0.25 mm deep groove proximate that end. Both ends suitably have chamfered edges.

Although the present invention has been described herein above with respect to two preferred embodiments, a range of other embodiments are conceivable within the scope of the invention and fall within the scope of the invention as claimed.

What is claimed is:

1. A security chain anchor for use in securing an article to a fixed surface to prevent its theft, said anchor comprising:
    a base having a central aperture adapted to receive a device for securing and retaining the base to the fixed surface, a first surface defining a radially outer surface of a first radius, and a second surface defining a radially outer surface of a second radius less than said first radius and adapted to be disposed between said first surface and said fixed surface;
    a loop-bearing member having an annular edge disposed on said second surface and secured and adapated to be retained between said first surface and said fixed surface effective to permit substantially full rotation of the loop-bearing member about the base; and
    a rigid loop adapted to receive a tether and pivotally mounted on the loop-bearing member, said rigid loop capable of pivoting away from said fixed surface by an amount effective to allow attachment of said tether.

2. The security chain anchor claimed in claim 1 wherein the loop is adapted to nest against the exterior of the loop-bearing member so that upper face presented by the anchor is substantially flat when the loop is not in use.

3. The security chain anchor claimed in claim 1 wherein the loop is formed as part of an annulus of a larger diameter than the loop-bearing member.

4. The security chain anchor claimed in claim 3 wherein the loop bearing member is substantially circular cylindrical, and the loop is part of a circular cylinder of larger diameter.

5. The security chain anchor claimed in claim 4 wherein the loop bearing member is part of a segment of a notional sphere and the loop is part of a segment of a larger notional sphere that is substantially concentric with the notional sphere of the loop bearing member.

6. The security chain anchor claimed in claim 1 wherein a radially inner face of the loop and a radially outer face of the loop bearing member nest together, each having a mating spherical curve.

7. The security chain anchor claimed in claim 1 wherein on or both of the loop-bearing member and the loop are formed from pipe sections.

8. The security chain anchor claimed in claim 1 wherein the base plate, loop-bearing member and loop are all concentrically positioned relative to the central aperture.

9. The security chain anchor claimed in claim 8 wherein central aperture is counterbored and the anchor further comprises a blanking cap that fits, tightly within the counterbore.

10. The security chain anchor claimed in claim 1, wherein the tether is a chain.

* * * * *